United States Patent
Ohta et al.

(10) Patent No.: US 8,743,818 B2
(45) Date of Patent: *Jun. 3, 2014

(54) METHOD FOR RANDOM ACCESS IN WIRELESS COMMUNICATION SYSTEM, WIRELESS COMMUNICATION SYSTEM, WIRELESS TERMINAL, AND BASE STATION UNIT

(75) Inventors: Yoshiaki Ohta, Kawasaki (JP); Yoshiharu Tajima, Kawasaki (JP); Kazuhisa Obuchi, Kawasaki (JP); Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,216

(22) Filed: Jun. 14, 2012

(65) Prior Publication Data
US 2012/0250628 A1 Oct. 4, 2012

Related U.S. Application Data

(63) Continuation of application No. 12/689,639, filed on Jan. 19, 2010, which is a continuation of application No. PCT/JP2007/065745, filed on Aug. 10, 2007.

(51) Int. Cl.
*H04W 74/08* (2009.01)
*H04W 72/04* (2009.01)
*H04J 3/16* (2006.01)
*H04L 12/413* (2006.01)

(52) U.S. Cl.
CPC .......... *H04W 74/08* (2013.01); *H04W 74/0833* (2013.01)
USPC ........... 370/329; 370/335; 370/350; 370/447; 370/461; 370/503; 455/450; 455/452.2

(58) Field of Classification Search
USPC ........ 370/328, 329, 330, 335–336, 342–343, 370/341; 455/450
See application file for complete search history.

(56) References Cited

U.S. PATENT DOCUMENTS

| | | | |
|---|---|---|---|
| 6,597,675 B1 * | 7/2003 | Esmailzadeh et al. | 370/335 |
| 6,621,803 B2 | 9/2003 | Halton et al. | |
| 6,643,275 B1 * | 11/2003 | Gustafsson et al. | 370/328 |
| 6,697,346 B1 | 2/2004 | Halton et al. | |

(Continued)

FOREIGN PATENT DOCUMENTS

| | | |
|---|---|---|
| EP | 1 168 877 | 1/2002 |
| JP | 09-116954 | 5/1997 |

(Continued)

OTHER PUBLICATIONS

Non-final Office Action issued by the United States Patent and Trademark Office for corresponding U.S. Appl. No. 13/528,524, electronically delivered Feb. 25, 2013.

(Continued)

*Primary Examiner* — Candal Elpenord
(74) *Attorney, Agent, or Firm* — Myers Wolin, LLC

(57) ABSTRACT

A method for random access in a wireless communication system communicating between a base station and a wireless terminal, the method consists of: at the wireless terminal, selecting first information used for first random access or second information used for second random access and performing a data communication with the base station during or after the completion of random access using selected information.

9 Claims, 21 Drawing Sheets

(56) References Cited

U.S. PATENT DOCUMENTS

| | | | |
|---|---|---|---|
| 6,708,040 | B1 | 3/2004 | Laroia et al. |
| 6,778,835 | B2 | 8/2004 | You et al. |
| 6,859,445 | B1 | 2/2005 | Moon et al. |
| 6,985,474 | B2 * | 1/2006 | Dahlman et al. .............. 370/347 |
| 7,088,734 | B2 | 8/2006 | Newberg et al. |
| 7,164,918 | B2 * | 1/2007 | Moulsley et al. ............. 455/450 |
| 7,197,314 | B2 | 3/2007 | Soldani et al. |
| 7,349,371 | B2 | 3/2008 | Schein et al. |
| 7,359,705 | B2 * | 4/2008 | Kornprobst ............... 455/435.3 |
| 7,680,156 | B2 * | 3/2010 | Jung et al. ..................... 370/522 |
| 7,701,961 | B2 * | 4/2010 | Lim et al. ...................... 370/445 |
| 7,746,915 | B1 | 6/2010 | Herrmann et al. |
| 7,789,373 | B2 | 9/2010 | Schulz et al. |
| 7,916,689 | B2 | 3/2011 | Jeong et al. |
| 7,986,946 | B2 | 7/2011 | Pettersson |
| 7,990,927 | B2 * | 8/2011 | Choi et al. .................... 370/335 |
| 8,000,305 | B2 | 8/2011 | Tan et al. |
| RE43,323 | E * | 4/2012 | Jurgensen et al. ............ 370/348 |
| 8,295,243 | B2 | 10/2012 | Malladi et al. |
| 2002/0114294 | A1* | 8/2002 | Toskala et al. ................ 370/329 |
| 2006/0239239 | A1* | 10/2006 | Yang ............................ 370/342 |
| 2007/0064665 | A1 | 3/2007 | Zhang et al. |
| 2007/0206531 | A1 | 9/2007 | Pajukoski et al. |
| 2008/0101306 | A1 | 5/2008 | Bertrand et al. |
| 2008/0188219 | A1 | 8/2008 | Fischer |
| 2008/0232283 | A1 | 9/2008 | Jen |
| 2008/0242308 | A1* | 10/2008 | Gunnarsson et al. ......... 455/450 |
| 2008/0273482 | A1 | 11/2008 | Lee et al. |
| 2008/0310396 | A1 | 12/2008 | Park et al. |
| 2009/0011769 | A1 | 1/2009 | Park et al. |
| 2009/0041240 | A1 | 2/2009 | Parkvall et al. |
| 2009/0080457 | A1* | 3/2009 | Liang et al. ................... 370/462 |
| 2010/0105405 | A1 | 4/2010 | Vujcic |

FOREIGN PATENT DOCUMENTS

| | | |
|---|---|---|
| JP | 2000-165316 | 6/2000 |
| JP | 2002-027539 | 1/2002 |
| KR | 2001-0113542 | 12/2001 |
| WO | 99/60729 | 11/1999 |
| WO | 2007/078165 | 7/2007 |

OTHER PUBLICATIONS

Korean Intellectual Property Office "Notice of Preliminary Rejection" issued for corresponding Korean Patent Application No. 10-2010-7002039, dated Feb. 2, 2012. English translation attached.
Patent Examination Report No. 1 issued for corresponding Australian Patent Application No. 2007357770, issued Sep. 19, 2012.
Non-Final Office Action issued by the United States Patent and Trademark Office for corresponding U.S. Appl. No. 13/527,133 electronically delivered on Feb. 14, 2013.
Office Action issued by the United States Patent and Trademark Office for corresponding U.S. Appl. No. 12/689,639, electronically mailed Aug. 15, 2012.
Notice of Preliminary Rejection issued by the Korean Intellectual Property Office for corresponding Korean Application No. 10-2010-7002039 mailed Feb. 2, 2012 with English Translation.
"Office Action" issued by the Mexican Institute of Industrial Property (MIIP) for corresponding Patent Application No. MX/a/2010/001611, mailed Sep. 27, 2011. English translation attached.
Korean Intellectual Property Office "Notice of Preliminary Rejection" issued for corresponding Korean Patent Application No. 10-2010-7002039, mailed May 31, 2011. English translation attached.
International Search Report for corresponding International Patent Application No. PCT/JP2007/065745, mailed Nov. 20, 2007.
3GPP TR 25.913 V7.3.0; 3rd Generation Partnership Project; Technical Specification Group Radio Access Network; Requirements for Evolved UTRA (E-UTRA) and Evolved UTRAN (E-UTRAN); (Release 7); Mar. 2006.
3GPP TS 36.300 V8.1.0; 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall Description; Stage 2; (Release 8), Jun. 2007.
"Non-Final Office Action", issued by the United States Patent & Trademark Office for corresponding U.S. Appl. No. 12/689,639, dated Feb. 15, 2012.
Notice of Preliminary Rejection issued for corresponding Korean Patent Application No. 10-2012-7014519 dated Sep. 5, 2013, with full English translation.
Artail et al., "A simple recursive scheme for adjusting the contention window size in IEEE 802.11e wireless ad hoc networks", www.sciencedirect.com, Jul. 14, 2006, pp. 3789-3803, Computer Communications 29, Beirut, Lebanon.
Final Office Action issued by the United States Patent and Trademark Office for corresponding U.S. Appl. No. 13/527,133, electronically delivered on Jul. 3, 2013.
Final Office Action issued by the United States Patent and Trademark Office for corresponding U.S. Appl. No. 13/528,524, electronically delivered Sep. 4, 2013.
Non-Final Office Action issued by the United States Patent and Trademark Office corresponding to U.S. Appl. No. 12/689,639 electronically delivered on Aug. 2, 2013.
Non-Final Office Action issued by the United States Patent and Trademark Office for corresponding U.S. Appl. No. 13/533,438, electronically delivered on Jun. 10, 2013.
Notice of Preliminary Rejection issued for corresponding Korean Patent Application No. 10-2012-7014518, mailed May 30, 2013, with full English translation.
Final Office Action issued for corresponding U.S. Appl. No. 12/689,639, issued Nov. 29, 2013.
Final Office Action issued by the United States Patent and Trademark Office for corresponding U.S. Appl. No. 13/533,438, mailed on Oct. 23, 2013.
Office Action issued for corresponding Mexican patent application No. MX/A/2012/007307, issued Sep. 26, 2013, with English translation.
Final Office Action issued by the United States Patent and Trademark Office for corresponding U.S. Appl. No. 13/528,519, electronically delivered on Feb. 27, 2014.
Non-Final Office Action issued by the United States Patent and Trademark Office for corresponding U.S. Appl. No. 13/528,519, electronically delivered Sep. 12, 2013.
Final Office Action issued by the United States Patent and Trademark Office for corresponding U.S. Appl. No. 13/527,133, electronically delivered on Mar. 21, 2014.

* cited by examiner

METHOD FOR RANDOM ACCESS IN WIRELESS COMMUNICATION SYSTEM, WIRELESS COMMUNICATION SYSTEM, WIRELESS TERMINAL, AND BASE STATION UNIT

CROSS-REFERENCE TO RELATED APPLICATION

The present application is a continuation of U.S. application Ser. No. 12/689,639, filed on Jan. 19, 2010, now pending, which is a continuation of PCT international application No. PCT/JP2007/065745 filed on Aug. 10, 2007 in Japan, the contents of each are herein wholly incorporated by reference.

FIELD

The embodiments discussed herein are related to a method for random access in a wireless communication system, a wireless terminal, and a base station unit.

BACKGROUND ART

For a mobile communication system such as mobile telephones, the third-generation scheme has started providing service through the use of CDMA scheme. The 3GPP (3rd Generation Partnership Project) (R) has been discussed over the next-generation mobile communication system (LTE: Long Term Evolution) which makes communication at a higher speed possible (see Non-Patent Document 1 below). In the project, reduction of delay in transmission is being discussed in addition to enhancement in transmission rate.

In the event of initiation of communication between a base station unit (evolved Node B: eNB) and a mobile station unit (User Equipment: UE) serving as a wireless terminal prepares in a mobile communication system, a channel is prepared through which the UE first transmits data. The 3GPP calls this channel a random access channel (RACH) and calls a communication starting procedure using a RACH random access (see Non-Patent Document 2 below).

A RACH includes minimum information that causes the eNB to recognize transmission from the UE. A RACH is used at the initiation of the communication and the subsequent communication uses an individual channel (or common channel). A RACH can be shared by a number of UEs unless two or more UEs concurrently use the RACH. For the above, a RACH uses an identifier called a signature with which the eNB can identify UEs concurrently transmitting data through the RACH.

Random access is carried out in the following four cases of: (1) transmission of first data; (2) establishment uplink synchronization when downlink data arrive; (3) request of uplink data transmission when uplink data arrive; and (4) establishment of synchronization with a destination base station when handover occurs. The direction from the eNB to the UE is defined as "downlink (DL)", and the reverse direction is defined as "uplink (UL)".

Here, when (1) transmission of first data or when (3) transmission of uplink data, the UE randomly selects one signature from available signatures (preambles) and uses the selected signature (Contention Based Random Access Procedure). Accordingly, there is a possibility, however being low, of two or more UEs concurrently transmit data using the same signature.

Conversely, the eNB allocates a dedicated signature to the UE in advance when (2) transmission of downlink data. A possible collision of a signature may cause an instantaneous interruption of the connection or communication disconnection of the communication when (4) handover occurs. Therefore, a dedicated signature is allocated to the UE that is the subject of the handover (Non-contention Based Random Access Procedure).

(a) Contention Based Random Access Procedure:

FIG. 20 illustrates an example of a random access procedure used in the above cases (1) and (3) disclosed in the non-Patent Document 2.

Upon uplink data arrival, the UE transmits a message (Random Access Preamble) #1-1 (uplink transmission request) containing a signature randomly selected to the eNB through the RACH (step S101). At that time, there is a possibility of occurrence of a contention because two or more UEs concurrently start transmission through the use of the same signature. However, even when a contention occurs, the eNB cannot recognize the effective ID of each UE and cannot therefore grasp that the contention occurs between which UEs.

Upon receipt of the message #1-1 (the signature), the eNB reply with the response message (Random Access Response) #1-2 to the received message #1-1 (step S102) along with a timing advanced as synchronization signals for uplink communication, an uplink grant for transmission permission, and others. If a number of UEs 20 concurrently transmit requests through the RACH, the eNB 10 returns the response message #1-2 to the UEs 20.

Next, the UE, which receives the response message #1-2, transmits the ID of the UE itself via a message (Scheduled Transmission) #1-3 to request the eNB 10 to schedule UL communication to the eNB (step S103).

Upon receipt of the message #1-3, the eNB recognizes the effective ID of the UE (hereinafter also called a terminal ID) and thereby can grasp that the contention of the signature occurs between which UEs. If a contention occurs, the eNB transmits a message (Contention Resolution) #1-4 to the UEs in question to resolve the contention (step S104).

(b) Non-Contention Based Random Access Procedure

FIG. 21 illustrates an example of a random access procedure (Non-contention Based Random Access Procedure) used in the above cases (2) and (4) disclosed in the Non-Patent Document 2.

The eNB allocates a dedicated signature to each UE under the control of the eNB via a message (Random Access Preamble assignment) #2-1 in advance (step S20).

The UE issues UL synchronization request to the eNB using the dedicated signature allocated by the eNB via the message #2-1. In other words, the UE transmits a message #2-2 containing a dedicated signature to the eNB through the RACH (step S202).

Upon receipt of the message #2-2, the eNB replies with the response message #2-3 to the received message (step S203) along with a timing advanced as synchronization signal, an uplink grant for transmission permission, and others.

Non-Patent Document 1: 3GPP, "Requirements for Evolved UTRA (E-UTRA) and Evolved UTRAN (E-UTRAN)", TR25.913 V7.3.0, Release 7 Mar. 2006

Non-Patent Document 2: 3GPP, "Evolved Universal Terrestrial Radio Access (E-UTRA) and Evolved Universal Terrestrial Radio Access Network (E-UTRAN)", TS36.300, Release 8, V8.1.0, June 2007

As described above, since the non-Patent Document 2 examines two kinds of procedure of random access, different procedures concurrently proceed in, for example, cases of (2) establishment uplink synchronization when downlink data arrive and (3) request of uplink data transmission when uplink data arrive.

Since different procedures concurrently proceeding as the above requires respective resources (such as signature), two kinds of signature are allocated while the procedures are proceeding so that the signatures are wasted.

SUMMARY (1) According to an aspect of the embodiments, a method includes a method for random access in a wireless communication system including a base station unit and a wireless terminal, the method including: at the wireless terminal, detecting first information used for first random access and second information used for second random access, the second information being received from the base station unit; and selecting one between the first information and the second information.

(2) According to an aspect of the embodiments, a method includes a method for random access in a wireless communication system including a base station unit and a wireless terminal, the method including: at the wireless terminal, receiving second information used for second random access in response to generation of downlink data from the base station unit before creating first information used for first random access in response to generation of uplink data destined for the base station unit, transmitting third information, which is transmitted to the base station unit during the first random access, to the base station unit during or after the completion of the second random access using the second information.

(3) According to an aspect of the embodiments, a system includes a wireless communication system including a base station unit and a wireless terminal, wherein the wireless terminal selects one from first information used for first random access and second information used for second random access, the second information being received from the base station unit; and the base station unit releases management of the information that is not selected between the first information and the second information.

(4) According to an aspect of the embodiments, an apparatus includes a wireless terminal including: creating means that creates first information used for first random access to a base station unit; receiving means that receives, from the base station unit, second information used for second random access to the base station unit; and selecting means that selects one between the first information and the second information.

(5) According to an aspect of the embodiments, an apparatus includes a base station unit including: managing means that manages first information used for first random access received from a wireless terminal and second information used for second random access transmitted to the wireless terminal; determining means that determines, based on third information received from the wireless terminal, one selected by the wireless terminal between the first information and the second information; and controlling means that continuing random access corresponding to the information that the determining means determines that the wireless terminal selects and that carries out control based on the third information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings. Note that the embodiments are not limited to the embodiments to be described below, but maybe modified in various ways without departing from sprits and scope of the embodiments, as a matter of course.

Figure 1:
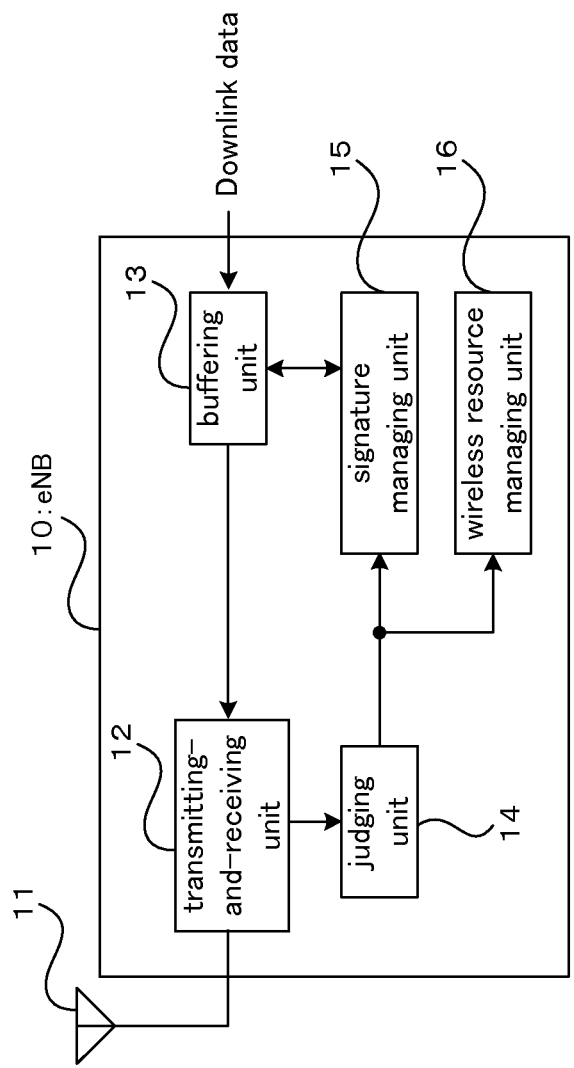
FIG. 1 is a functional block diagram illustrating a base station (eNB) according to a first embodiment.
Figure 2:
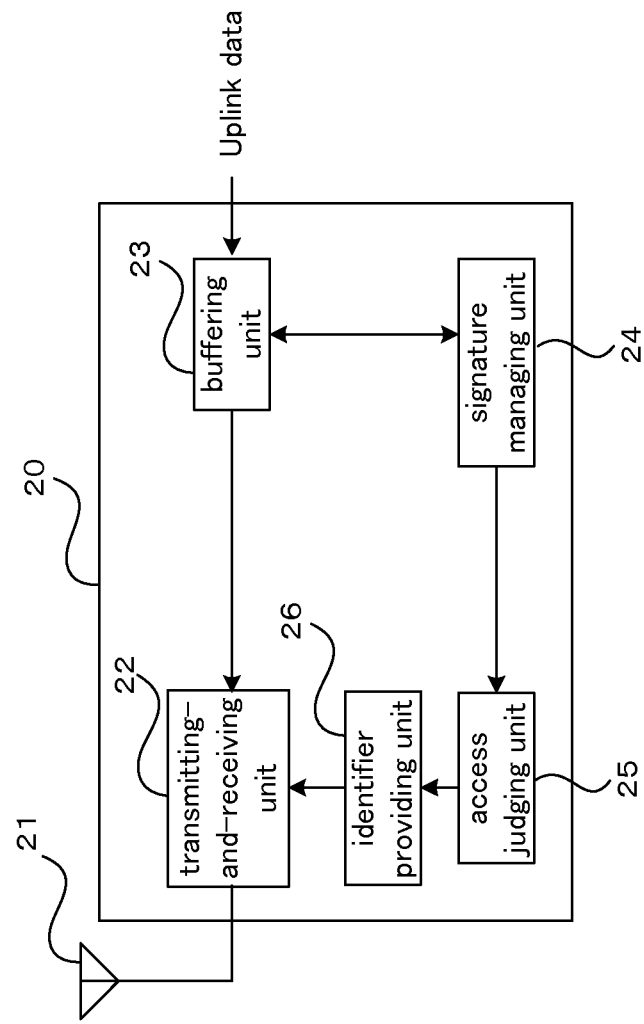
FIG. 2 is a functional block diagram illustrating a mobile station (UE) according to the first embodiment.

(1) First Embodiment:

FIG. 1 is a functional block diagram of a base station unit (eNB) according to the first embodiment; and FIG. 2 is a functional block diagram of a mobile station unit (UE)

according to the first embodiment. The eNB 10 and the UE 20 form a wireless communication system. The wireless communication system can include a number of eNBs 10 and a number of UEs 20. The configurations illustrated in FIGS. 1 and 2 are also common to second through fourth embodiments detailed below unless otherwise specified. In addition, the base station unit 10 of the first embodiment assumes to be an LTE eNB which possesses a part of or the entire function of a radio network controller (RNC), but may be a base station of a former generation of the LET (i.e., without the function of RNC). In addition, the base station may comply with any system as long as adopting both the contention based random access procedure and the non-contention based random access procedure.

(Description of eNB)

Focusing on the major functions, the eNB 10 illustrated in FIG. 1 includes, for example, an antenna 11, a transmitting/receiving unit, a buffering unit 13, a judging unit 14, a signature managing unit 15, and a wireless resource managing unit 16.

Here, the antenna 11 receives an uplink wireless signal from the UE 20 while transmits downlink wireless signal to the UE 20. The antenna 11 is commonly used for transmitting and receiving, but alternatively an antenna for transmitting may be separated from an antenna for receiving.

The transmitting/receiving unit (transmitting means, receiving means) 12 performs predetermined receiving processing on an uplink wireless signal received by the antenna 11 while performs predetermined transmitting processing on data (downlink data) from the buffering unit 13.

The receiving processing includes, for example, low-noise amplification, frequency conversion (down-conversion) to the baseband frequency, gain adjustment, demodulation by a predetermined demodulating scheme, and decoding by a predetermined decoding scheme. The transmitting processing includes encoding of the uplink transmission data by a predetermined encoding scheme, modulating of the encoded data by a predetermined modulating scheme (such as QPSK or 16 QAM), creating of a predetermined wireless frame, frequency conversion (up-conversion) to the radio frequency, and electric power amplification. The above wireless frame is exemplified by one conforming to OFDMA, OFDMA, or others.

The buffering unit 13 temporarily stores downlink data destined for the UE 20 under the control of the signature managing unit 15. The judging unit (determining means) 14 has a function of determining which signature was selected between a random signature and a dedicated signature through judging, on the basis of uplink data (message) subjected to receiving processing in the transmitting/receiving unit 12, whether or not an UL synchronization request or an UL scheduling request is issued from the UE 20.

In the first embodiment, a random signature represents a signature (first information) that the UE 20 randomly creates and a dedicated signature represents a signature (second information) that the eNB 10 allocates (sends) to the UE 20. The detailed method for the judgment will be described below.

The signature managing unit (managing means) 15 manages a signature (Random Access Preamble, hereinafter also called a preamble) used for random access (procedure), creates a downlink message destined for the UE 20 and used for random access, and has a function of allocating and releasing a signature for the UE 20. The release is based on the result of the judgment by the judging unit 14.

The wireless resource managing unit 16 manages UL and DL wireless resources (e.g. channel frequency and time (transmitting/receiving timings)) to be used for communication (including communication when random accessing) with the UE 20 and allocation of the resources. For example, when OFDMA is adopted, the wireless resource managing unit 16 has a function to manage the mapping of a two-dimensional transmitting/receiving region (called a burst) defined in terms of the sub-channel frequency and the symbol time.

In addition, the wireless resource managing unit 16 has a function as controlling means that carries out control based on an uplink message (third information) which is received from the UE 20 during random access corresponding to the signature that is not selected by the UE 20.

(Description of UE)

Focusing on the major functions, the UE 20 illustrated in FIG. 2 includes, for example, an antenna 21, a transmitting/receiving unit 22, a buffering unit 23, a signature managing unit 24, an access judging unit 25, and an identifier providing unit 26.

Here, the antenna 21 receives a downlink wireless signal from the eNB 10 while transmits an uplink wireless signal to the eNB 10. Also the antenna 21 is commonly used for transmitting and receiving, but alternatively, an antenna for transmitting may be separated from an antenna for receiving.

The transmitting/receiving unit (transmitting means, receiving means) 22 performs predetermined receiving processing on a downlink wireless signal received by the antenna 21 while performs predetermined transmitting processing on data (uplink data) from the buffering unit 23 and on an uplink message (e.g., a Random Access Preamble and a Scheduled Transmission message) destined for an eNB via the identifier providing unit 26.

The receiving processing by the UE 20 also includes, for example, low-noise amplification, frequency conversion (down-conversion) to the baseband frequency, gain adjustment, demodulation by a predetermined demodulating scheme, and decoding by a predetermined decoding scheme. The transmitting processing includes encoding of the uplink transmission data by a predetermined encoding scheme, modulating of the encoded data by a predetermined modulating scheme (such as QPSK or 16 QAM), multiplexing (mapping) of uplink data to a predetermined wireless frame, frequency conversion (up-conversion) to the radio frequency, and electric power amplification.

The buffering unit 23 temporarily stores uplink data destined for the eNB 10 under the control of the signature managing unit 24, which manages a signature (Random Access Preamble) used for random access processing (procedure).

The access judging unit 25 generates a predetermined message to be used for the random access procedure in cooperation with the signature managing unit 24. In this example, the access judging unit 25 has a function of monitoring (confirming) whether or not multiple allocation of signatures occurs, that is, whether or not a dedicated signature allocated by the eNB 10 and a random signature randomly created by the UE 20 itself (by the signature managing unit 24) exist and in the event of occurrence multiple allocation, determining which signature is made to be effective.

The identifier providing unit 26 has a function of providing an uplink message (e.g., a message informing of the terminal ID) which is destined for the eNB 10 and which is generated by the access judging unit 25 with information (an identifier, a flag, or the like) indicating that the uplink message also serves as a message that requests to transmit an uplink data (UL scheduling) because also uplink data is being generated at the UE 20 or that the uplink message serves as UL synchronization confirmation responsive an UL synchronization requests required for receiving downlink data because downlink data arrives at the eNB 10. The UL synchronization confirmation is a notification (confirmation response) to the eNB 10 that the UE 20 secures UL synchronization due to correct receiving UL timing information from the eNB 10.

(Description of a Random Access Procedure)

Figure 3:
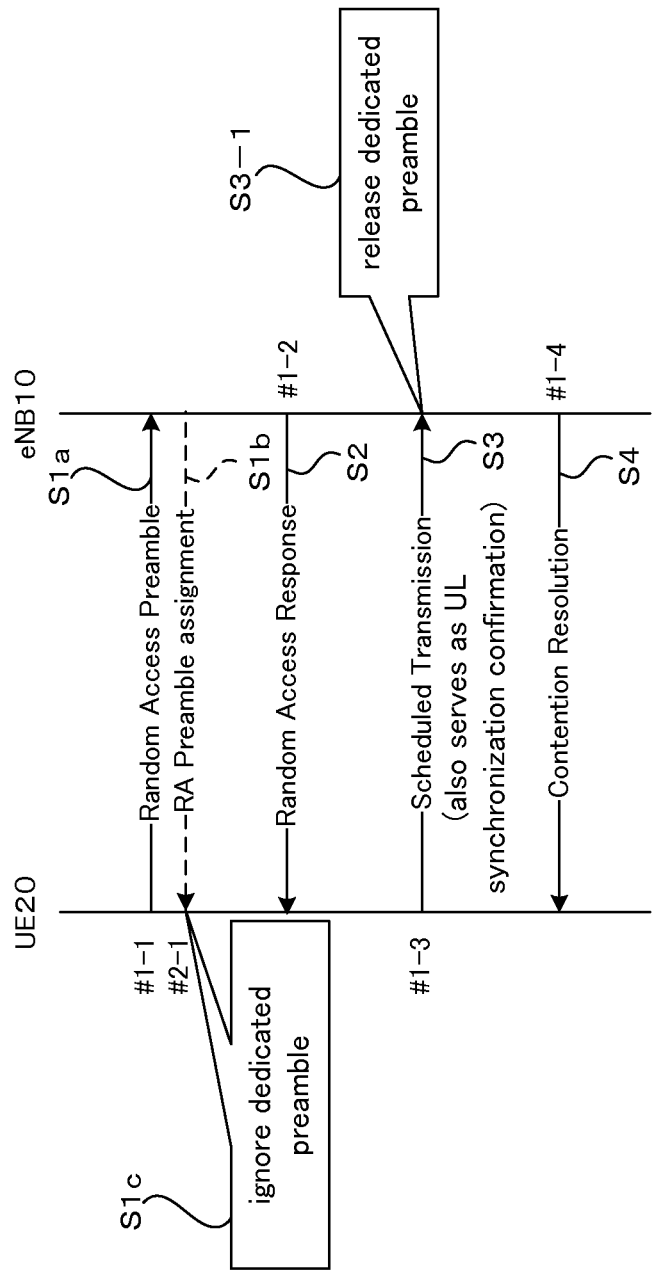
FIG. 3 is a sequence diagram explaining a procedure (method) of random access according to the first embodiment.
Figure 4:
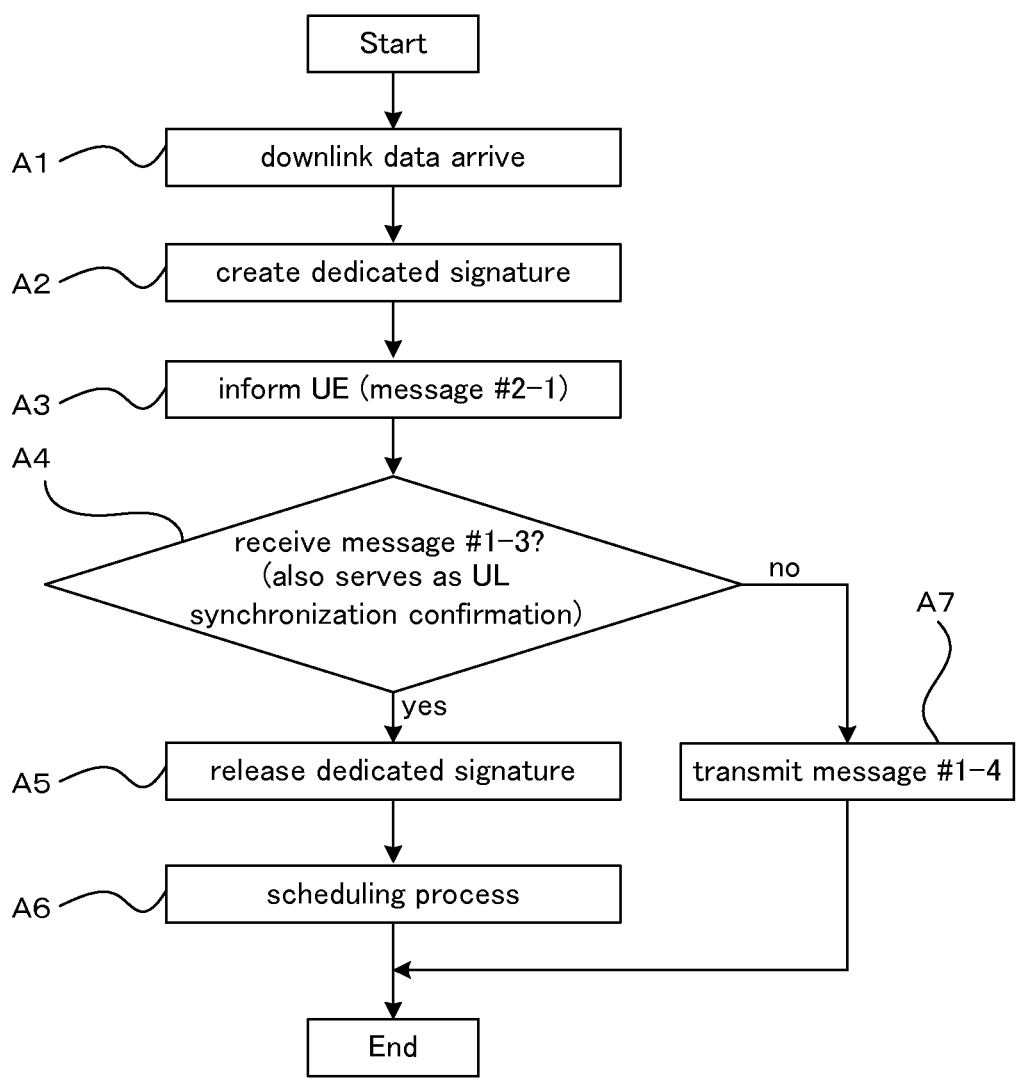
FIG. 4 is a flow diagram explaining the operation of the eNB when carrying out the random access procedure of FIG. 3.

Hereinafter, detailed description will now be made in relation to an operation (a random access procedure) in a wireless communication system of the first embodiment having the above configuration with reference to FIGS. 3 through 5. FIG. 3 is a sequence diagram explaining the random access procedure (method) of the first embodiment; FIG. 4 is a flow diagram explaining the operation of the eNB 10 when the random access procedure of the first embodiment is being carried out; and FIG. 5 is a flow diagram explaining the operation of the UE 20 when the random access procedure of the first embodiment is being carried out.

Figure 20:
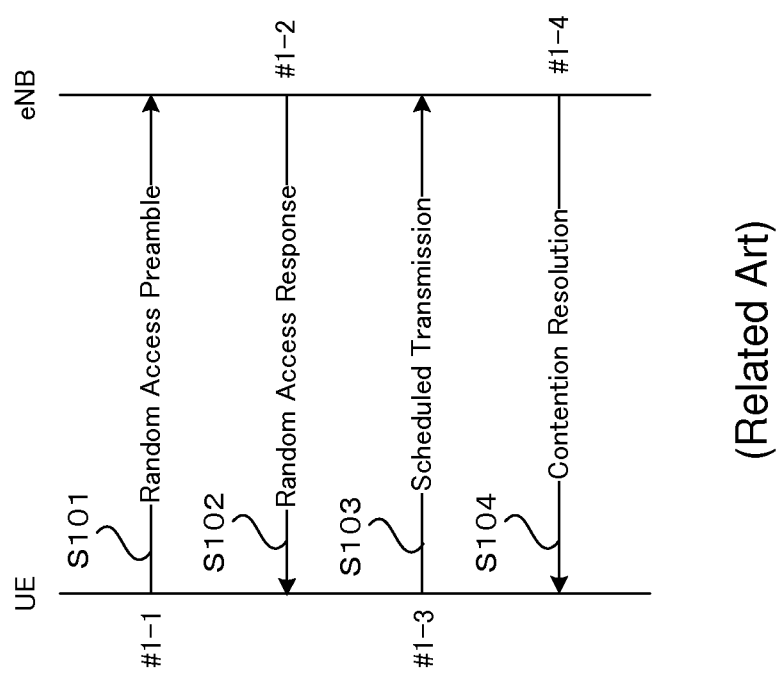
FIG. 20 is a sequence diagram explaining a conventional procedure of random access (contention based random access)
Figure 21:
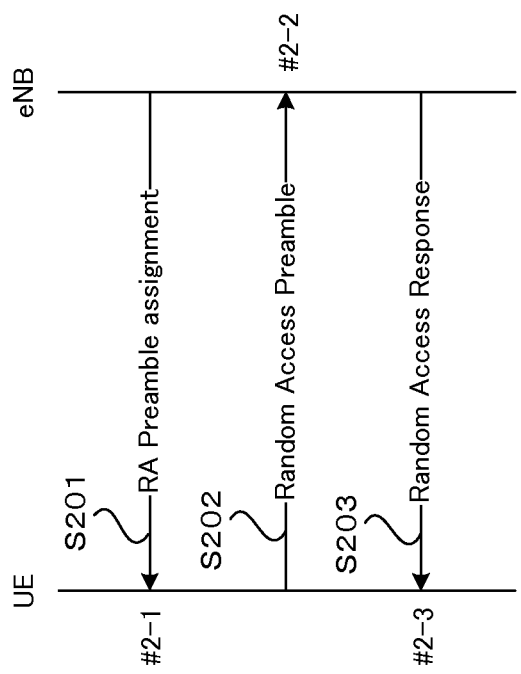
FIG. 21 is a sequence diagram explaining a conventional procedure of random access (non-contention based random access).

Hereinafter, similarly to the description of FIGS. 20 and 21, the messages with the reference numbers #1-1 through #1-4 represents messages originally used for the contention based random access procedure (first random access) and messages with the reference numbers #2-1 through #2-3 originally used for the non-contention based random access procedure (second random access).

Figure 5:
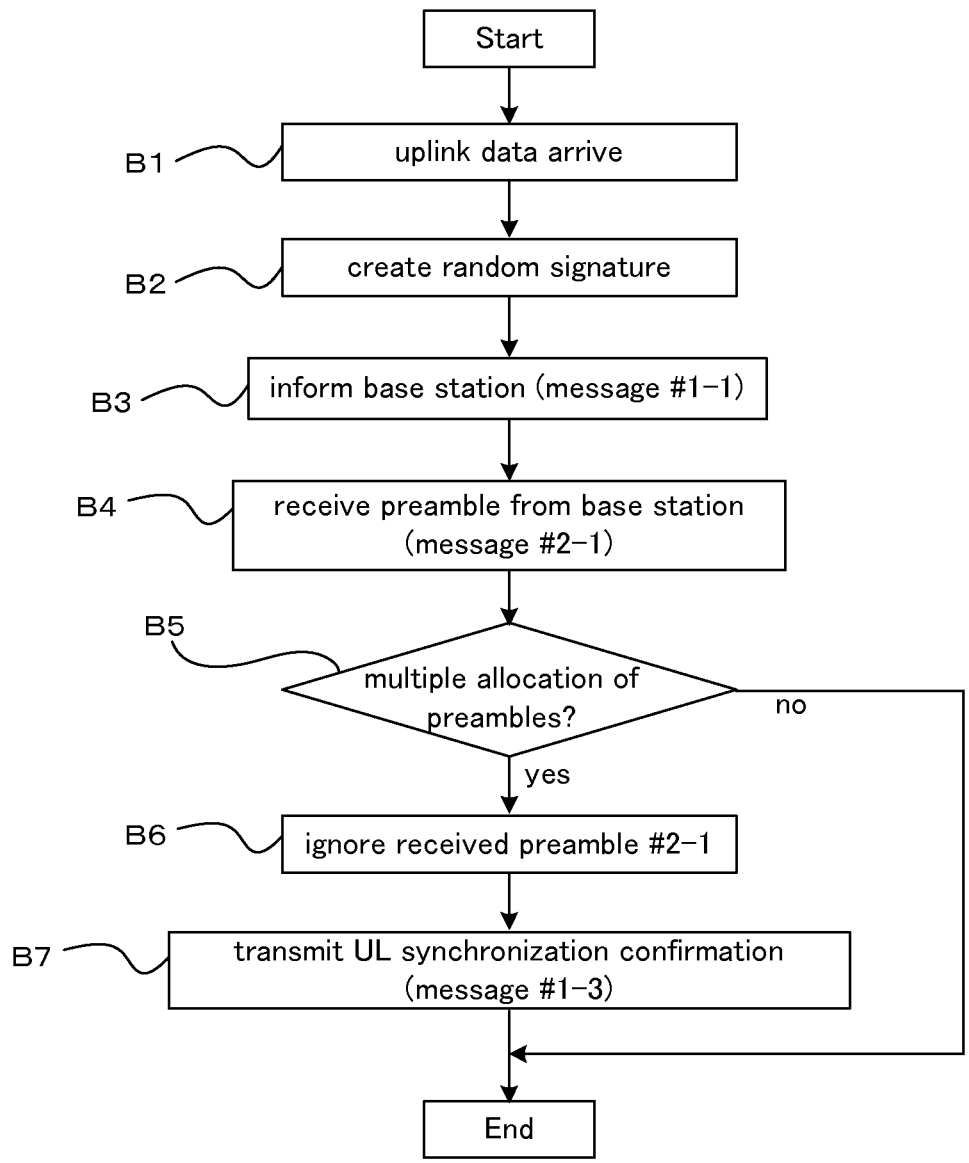
FIG. 5 is a flow diagram explaining the operation of the UE when carrying out the random access procedure of FIG. 3.

First of all, when the UE 20 generates uplink data and the buffering unit 23 stores the uplink data (step B1 in FIG. 5), the UE 20 generates and stores a random signature (Random Access Preamble) at the signature managing unit 24 (step B2 in FIG. 5). Namely, the signature managing unit 24 has a function as creating means that creates a signature to be used for the contention based random access, which is executed when uplink data destined for the eNB 10 is generated.

After that, the UE 20 creates a random access preamble message (uplink transmission request) #1-1 containing the created signature at the access judging unit 25 and transmits the created message to the eNB 10 from the antenna 21 via the transmitting/receiving unit 22 (step S1a of FIG. 3 and step B3 in FIG. 5).

Upon receipt of the uplink transmission request message #1-1, the eNB 10 replies with a response message (Random Access Response) #1-2 responsive to the received uplink transmission request message #1-1 (step S2 in FIG. 3) along with a timing advanced as synchronization message for uplink communication, an uplink grant for transmission permission, and others. If a number of UEs 20 concurrently transmit requests through the RACH, the eNB 10 returns the response message #1-2 to the UEs 20.

Here, presuming that the eNB 10 could not recognize the uplink transmission request message #1-1 that the UE 20 transmits because downlink data destined for the UE 20 arrived at the eNB 10 from the upper apparatus (i.e., the buffering unit 13 stores downlink data) before the transmission of the response message #1-2 (step Al in FIG. 4) and the eNB 10 does not complete the receiving process on the downlink data.

In this case, the signature managing unit 15 of the eNB 10 creates and stores a signature (dedicated signature, the second information) that the UE 20 that is the destination of the downlink data uses for random access (UL synchronization request) (step A2 in FIG. 4), and transmits the dedicated signature to the UE 20 through the use of a signature allocation message (RA Preamble Assignment) #2-1 (step S1b in FIG. 3 and step A3 in FIG. 4).

When transmission of the uplink transmission request message #1-1 (step S1a in FIG. 3) and the signature allocation message #2-1 (step S1b in FIG. 3) is completed, the eNB 10 cannot recognize "which UE 20 uses which signature". In other words, the eNB 10 cannot recognize that the two signatures (Random Preamble and Dedicated Preamble) are issued for which UE 20 because according to Non-Patent Document 2, either message does not contain information (terminal ID) to identify the UE 20.

According to Non-Patent Document 2, since the terminal ID can be contained in a message (Scheduled Transmission) #1-3, the eNB 10 grasps which UE 20 uses which signature after the receipt of the message #1-3 from the UE (step S3 in FIG. 3).

Conversely, regardless of whether or not the UE 20 notifies the terminal ID of the UE 20 itself to the eNB 10, when transmission of the uplink transmission request message #1-2 (step S1a in FIG. 3) and the signature allocation message #2-1 (step S1b in FIG. 3) is completed, both the random signature created by the UE 20 itself and the dedicated signature (Dedicated Preamble) allocated by the eNB 10 exist in the UE 20, in other words, the UE 20 can recognize (detect) occurrence of the two kinds of random access.

If a number of signatures are issued for a single UE 20 as the above case, the UE 20 determines which signature is to be used. Specifically, when the UE 20 receives (allocation of) a dedicated signature from the eNB 10 from the step S2 (step B4 in FIG. 5), the access judging unit 25 confirms, in cooperation with the signature managing unit 24, whether or not multiple allocation of two signatures (preambles) occurs (step B5 in FIG. 5).

The confirmation concluded occurrence of multiple allocation (yes route in step B5), the UE 20 (the access judging unit 25) ignores the dedicated signature allocated by the eNB 10 (step S1c in FIG. 3 and step B6 in FIG. 5), and selects the random signature created by the UE 20 itself as an effective signature. In other words, the access judging unit 25 has a function of selecting means which selects one between the two signatures. In addition, when no multiple allocation occurs, the UE 20 determines the random signature created by the UE 20 itself to be effective (no route in step B5).

Thereby, the random access procedure (contention based random access procedure) using the random signature created by the UE 20 becomes effective, so that the UE 20 continues the contention based random access procedure.

In other words, the UE 20 creates a message #1-3 and transmits the message to the eNB 10 (step S3 in FIG. 3 and step B7 in FIG. 5). At that time, the UE 20 grasps, through receiving the signature allocation message #2-1, that the downlink data destined for the UE 20 itself arrives at the eNB 10, and therefore transmits the message #1-3 to the eNB 10 preferably after providing the message with information (such as an identifier or a flag) indicating that "the message #1-3 also serves as UL synchronization confirmation required for receiving downlink data". UL synchronization confirmation is a confirmation response that UL synchronization is secured because the UE 20 correctly receives UL timing information contained in the message (Random access Response) #1-2.

In other words, UL synchronization request (third information), which is transmitted to the eNB 10 during the non-contention random access which is however not selected, is a message to receive UL timing information from the eNB 10 for UL synchronization, but the UE 20 already obtains the timing information during the contention based random access (#1-2). For the above, the UE 20 provides UL synchronization confirmation informing eNB 10 of securing of UL synchronization to the message #1-3 to be transmitted and then transmits the message #1-3.

However, as described above, since the eNB 10 recognizes the UE 20 to which two signatures are allocated at the time of receiving the message #1-3, the eNB 10 can implicitly judge that the message #1-3 also serves as a UL synchronization request even when the identifier or a flag is not explicitly provided.

Upon recognition of receiving the message (also serving as UL synchronization confirmation) #1-3 (yes route of step A4 in FIG. 4), the eNB 10 judges in the judging unit 14 that the dedicated signature allocated to the UE 20 is ignored in the same UE 20 (that is, the random signature created by the UE 20 is preferentially selected) and consequently releases the dedicated signature allocated to the same UE 20 in the signature managing unit 15 (step S3-1 in FIG. 3 and step A5 in FIG. 4).

Accordingly, the random access procedure (the non-contention based random access procedure) using the dedicated signature allocated by the eNB 10 is halted, so that the dedicated signature allocated to the UE 20 can be released during the random access procedure (at an early stage), which makes it possible to efficiently use signatures. Here, if the message #1-3 is determined not to also serve as UL synchronization confirmation (no route in step S4), the downlink data does not arrive and only normal uplink communication occurs, so that the eNB 10 transmits a message #1-4 (step A7).

The eNB 10 starts processing (control), such as scheduling of downlink data, based on the UL synchronization confirmation (third information) in the wireless resource managing unit 16 (step A6 in FIG. 4).

By receiving of the message (also serving as UL synchronization confirmation) #1-3, the eNB 10 can recognize that the response (Random Access Preamble) to the signature allocation message #2-1 from the UE 20 can be omitted, so that unnecessary retransmission of the signature allocation message #2-1 can be avoided. Further, reception of the message #1-3 used for the contention based random access procedure, despite allocation of the dedicated signature, makes the eNB 10 possible to recognize generation of uplink data at the UE 20.

Since the eNB 10 grasps the effective ID of the UE 20 through receiving the message (also serving as UL synchronization confirmation) #1-3, so that the eNB 10 can recognize that the contention occurred between which UEs. The contention can be resolved by transmitting a Contention Resolution message #1-4 to the UEs 20 in question (step S4 in FIG. 3).

Figure 6:
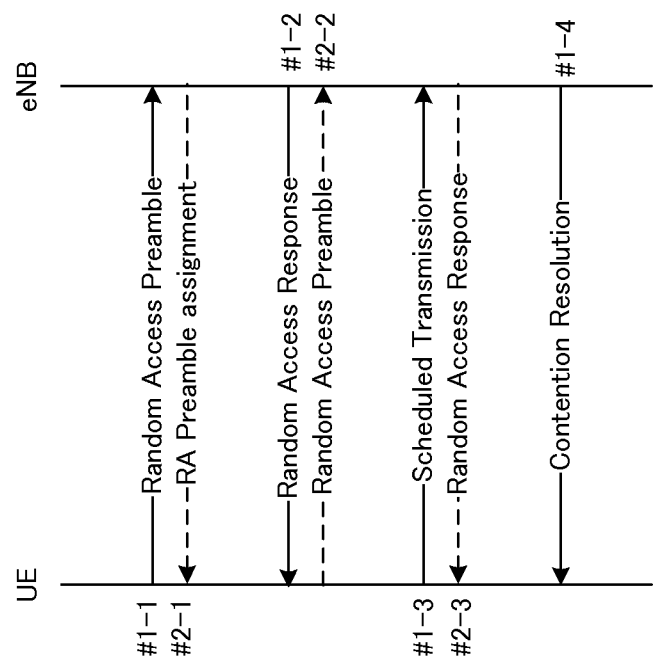
FIG. 6 is a sequence diagram explaining a case in which different random access procedures are concurrently proceeding.

As described above, in the method of random access of the first embodiment, even when uplink data and downlink data arrive in the same UE 20, the UE 20 selects the signature the UE 20 itself created and thereby the contention based random access is continued. Consequently, the two kinds of random access procedure do not concurrently proceed for a single UE 20 until the last stage as denoted in FIG. 6. Accordingly, the control plane of the random access can be simplified and signatures used for random access can be efficiently used. In addition, the interference of the random access channel can be inhibited.

However, the two kind of random access procedure can be concurrently proceeded. Accordingly, for example, in the event that the message (UL synchronization confirmation) #1-3 is contend with another UE, the UE 20 recognizes occurrence of the contention with reference to the Contention Resolution message #1-4 notified from the eNB 10. In this case, since continuation of the non-contention based random access may require a time to secure UL synchronization, the contention based random access can be concurrently executed through the use of a dedicated signature allocated in the message #2-1 by eNB 10. However, the expiration period of a dedicated signature for the UE 20 needs to be set to be long in that case.

Since the information (UL synchronization confirmation) which is transmitted to the eNB 10 during the non-contention based random access that is not selected is transmitted to eNB 10 during the contention based random access, the reception processing of downlink data can be surely carried out along with the transmitting processing on uplink data.

Further, since the UL synchronization confirmation can be common to the uplink message #1-3 that is originally determined to be transmitted to the eNB 10 during the contention based random access that is selected, there is no need to prepare (define) an unlink message dedicated to UL synchronization confirmation, so that the wireless resource can be efficiently used.

Further, since the first embodiment can reduce the number of messages that are communicated between the eNB 10 and the UE 20 as compared with a second embodiment to be detailed below, it is possible to efficiently use the wireless resource and to shorten error recovery with the use of retransmission control (HARQ: Hybrid Automatic Repeat reQuest).

Figure 7:
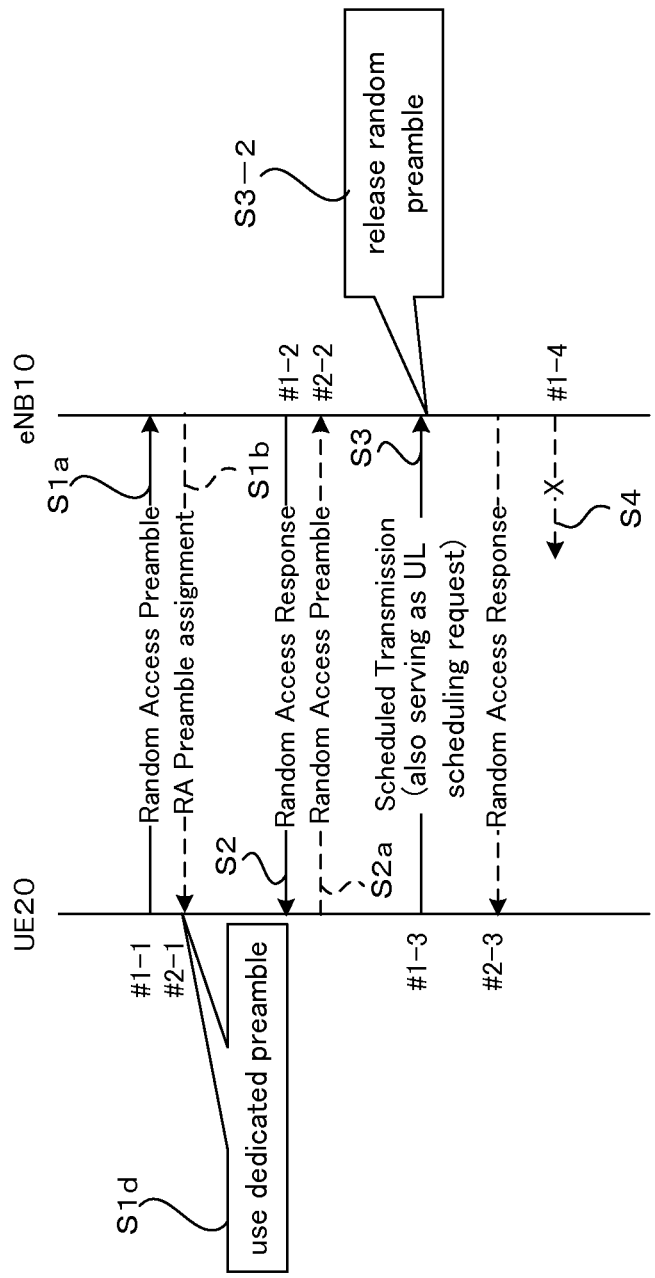
FIG. 7 is a sequence diagram explaining a procedure (method) of random access according to a second embodiment.
Figure 8:
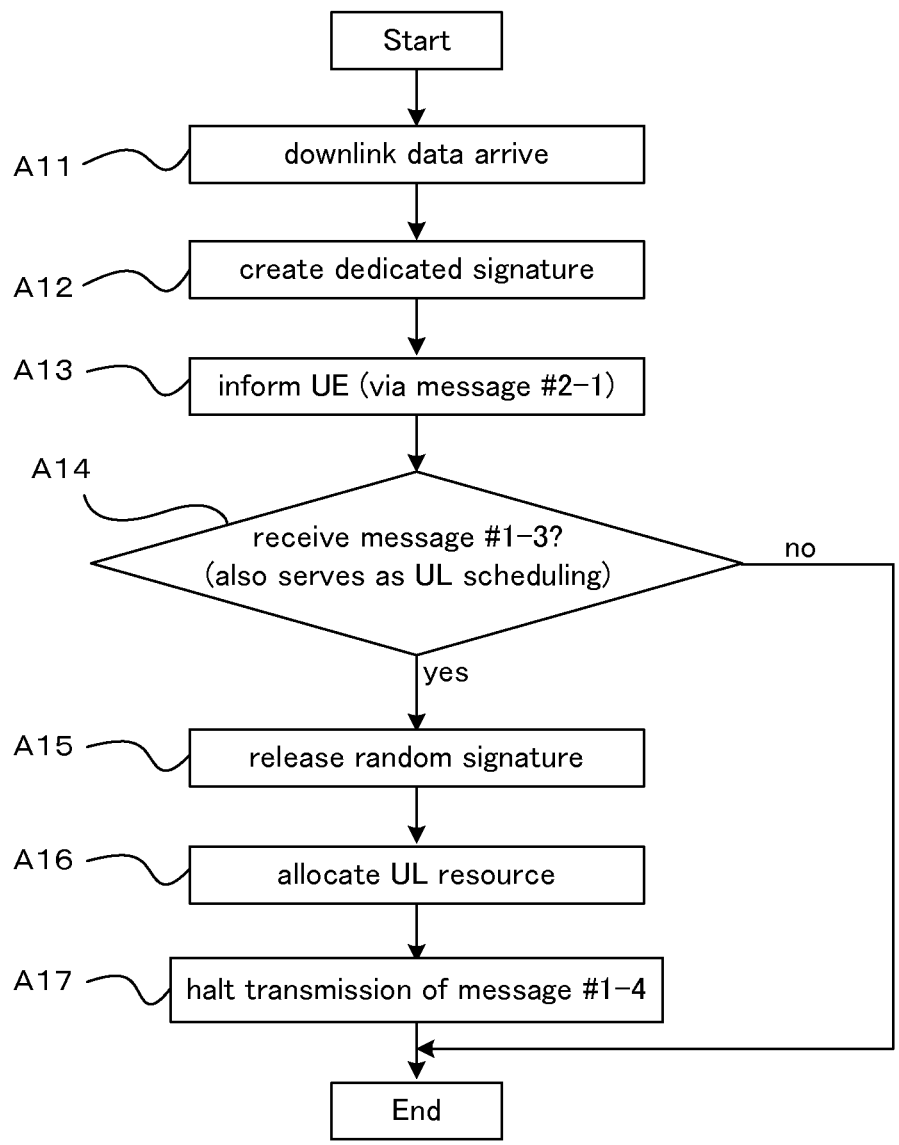
FIG. 8 is a flow diagram explaining the operation of the eNB when carrying out the random access procedure of FIG. 7.

(2) Second Embodiment:

FIG. 7 is a sequence diagram illustrating a random access procedure according to the second embodiment; FIG. 8 is a flow diagram explaining the operation of eNB 10 during the random access procedure of the second embodiment; and FIG. 9 is a flow diagram explaining the operation of UE 20 during the random access procedure of the second embodiment.

In the second embodiment, in the event of occurrence of multiple allocation of the preambles, the UE 20 ignores the signature (first information) created by the UE 20 itself and selects the dedicated signature (second information) allocated by the eNB 10. Thereby, the non-contention based random access procedure continues.

Figure 9:
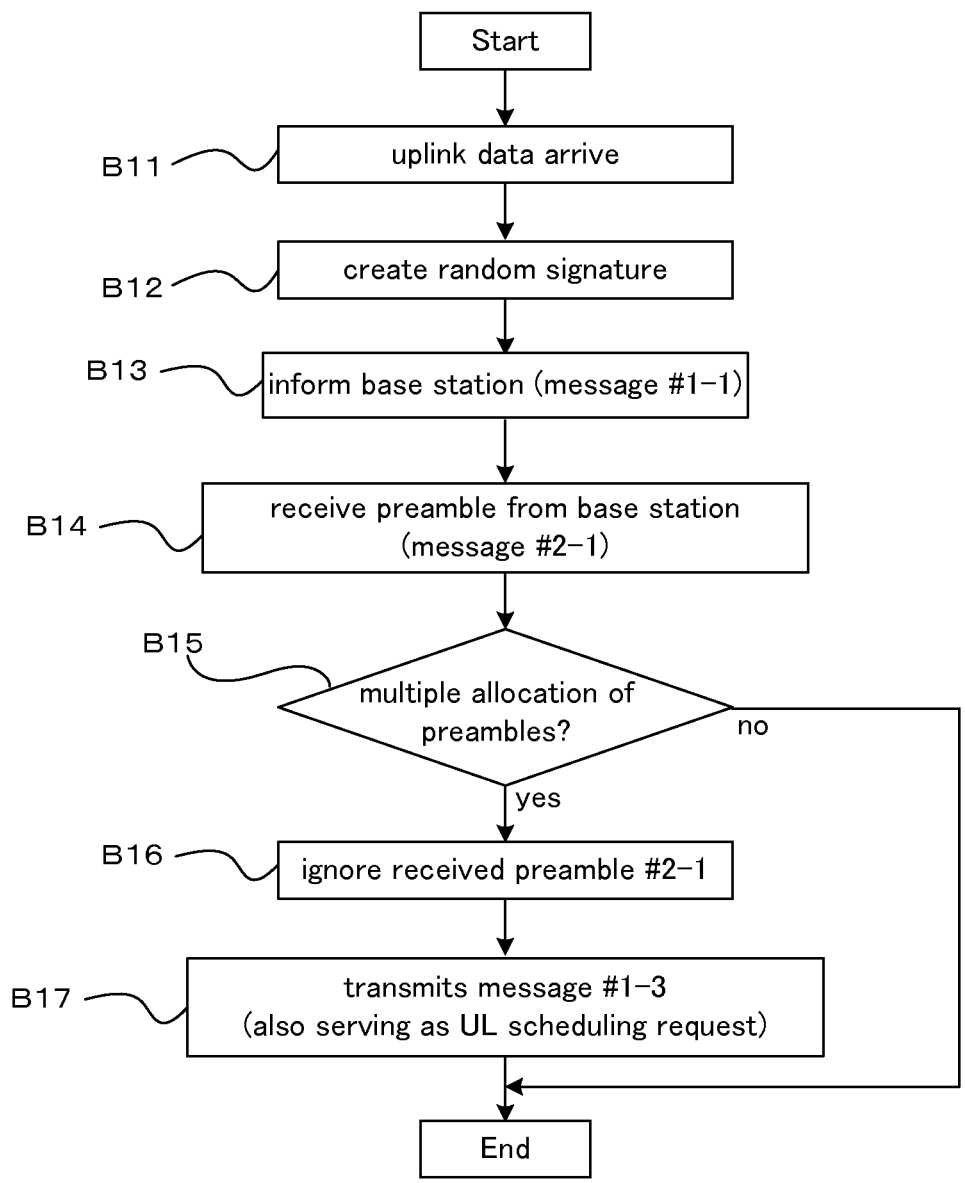
FIG. 9 is a flow diagram explaining the operation of the UE when carrying out the random access procedure of FIG. 7.

First of all, when uplink data arrive in the UE 20 and is stored in the buffering unit 23 (step B11 in FIG. 9), the UE 20 creates and stores a random signature (Random Access Preamble) at the signature managing unit 24 (step B12 in FIG. 9), creates an uplink transmission request (Random Access Preamble) message #1-1 containing the signature at the access judging unit 25, and transmits the message #1-1 from the antenna 21 via the transmitting/receiving unit 22 (step S1a in FIG. 7 and step B13 in FIG. 9).

Upon receipt of the uplink transmission request message #1-1, the eNB 10 replies with a response message (Random Access Response) #1-2 to the received uplink transmission request message (step S2 in FIG. 7) along with a timing advanced for synchronization signal for uplink communication, an uplink grant for transmission permission, and others. If a number of UEs 20 concurrently transmit requests through the RACH, the eNB 10 returns the response message #1-2 to the UEs 20.

Here, also in the second embodiment presumes that the eNB 10 could not recognize the uplink transmission request message #1-1 transmitted by the UE 20 because downlink data destined for the UE 20 arrived at the eNB 10 from the upper apparatus (i.e., the buffering unit 13 stores downlink data) before the transmission of the response message #1-2 (step A11 in FIG. 8) and the eNB 10 does not complete the receiving process on the downlink data.

In this case, the signature managing unit 15 of the eNB 10 creates and stores a signature (dedicated signature) that the UE 20 that is the destination of the downlink data uses for random access (UL synchronization request) (step A12 in FIG. 8), and transmits the dedicated signature to the UE 20 through the use of a signature allocation message (RA Preamble Assignment) #2-1 (step S1b in FIG. 7 and step A13 in FIG. 8).

The UE 20, which receives the signature allocation message #2-1, transmits, to the eNB 10 through the RACH, a message (Random Access Preamble) #2-2 containing the dedicated signature allocated by the eNB 10. (step S2*a* in FIG. 7).

Here, when transmission of the uplink transmission request message #1-1 (step S1*a* in FIG. 7) and signature allocation message #2-1 (step S1*b* in FIG. 7) is completed, the UE 20 can recognizes the presence of both the random signature created by the UE 20 itself and the dedicated signature allocated by the eNB 10.

Therefore, the UE 20 judges which signature is to be used. In other words, when the eNB 10 allocates a signature from step S2 (step B14 in FIG. 9), the UE 20 of the second embodiment confirms, in cooperation with the signature managing unit 24, whether or not multiple allocation of two signatures (preambles) is occurring (step B15 in FIG. 9).

As a result, when multiple allocation is occurring (yes route in step B15), the UE 20 ignores the random access signature created by the UE 20 itself (the signature transmitted to the eNB 10) (step S1*d* in FIG. 7 and step B16 in FIG. 9), and selects the dedicated signature allocated by the eNB 10 as an effective signature. When multiple allocation is not occurring, the dedicated signature is made effective (no route in step B15).

Consequently, the random access procedure (the non-contention based random access procedure) through the use of the dedicated signature allocated by the eNB 10 continues.

After that, the UE 20 creates the message #1-3 and transmits the created message to the eNB 10 (step S3 in FIG. 7 and step B17 in FIG. 9). Concurrently, since also uplink data arrive, the UE 20 provides the message #1-3 with information (an identifier or a flag) indicating that the message #1-3 also "serves as a message (UL scheduling request) to request transmission (scheduling) of unlink data" by the identifier providing unit 26 and transmits the message #1-3 to the eNB 10.

In other words, UL scheduling request (third information), which is transmitted to the eNB 10 during the contention random access, which is not selected, is provided to the message #1-3 destined for the eNB 10 and is transmitted to the eNB 10.

However, as described above, since the eNB 10 recognizes a UE 20 to which two signatures are allocated at the time of receiving the message #1-3, the eNB 10 can implicitly judge that the message #1-3 from the UE 20 also serves as a UL scheduling request even when the identifier or a flag is not explicitly provided.

Upon recognition of receiving the message (also serving as UL scheduling request) #1-3 (yes route of step A14 in FIG. 8), the eNB 10 judges that the UE 20 makes the dedicated signature allocated by the eNB 10 to the UE 20 effective, and releases the random signature which the eNB 10 manages and which is received from the UE 20 in the signature managing unit 15 (step S3-2 in FIG. 7 and step A15 in FIG. 8).

Consequently, the random access procedure (the contention based random access) through the use of the random signature created by the UE 20 becomes ineffective (halts), so that the dedicated signature can be released during the random access procedure (at an early stage), which makes it possible to efficiently use signatures.

In the eNB 10, the wireless resource managing unit 16 carries out processing (control) of allocation of UL wireless resource in response to the UL scheduling request (step A16 in FIG. 8). Since the second embodiment makes the dedicated signature effective, there is no need to transmit Contention Resolution message #1-4 used for the contention based random access procedure to the UE 20 in question and therefore the transmission can be halted (step S4 in FIG. 7 and step A17 in FIG. 8). In addition, if the eNB 10 judges that the message #1-3 does not serve as the UL scheduling request, the eNB 10 terminates the processing (no route in step A14 in FIG. 8).

As describe above, according to the method of random access of the second embodiment, even when uplink data and downlink data are concurrently arrive in the same UE 20, the UE 20 selects the signature allocated by the eNB 10 and thereby the non-contention based random access is continued. Consequently, the two kinds of random access procedure do not concurrently proceed until the last. Accordingly, the control plane of the random access can be simplified and signatures used for random access can be efficiently used. In addition, the interference of the RACH can be inhibited.

Since the information (UL scheduling request) which is transmitted to the eNB 10 during the contention based random access that is not selected is transmitted to eNB 10 during the contention based random access, the reception processing of downlink data can be surely carried out along with the transmitting processing on uplink data.

Further, when the UL scheduling request to the eNB 10 is common to the uplink message #1-3, there is no need to prepare (define) an unlink message dedicated to UL scheduling request, so that the wireless resource can be efficiently used.

The first and the second embodiments assumes that the eNB 10 transmits the signature allocation request message #2-1 to the UE 20 after the UE 20 transmits the uplink transmission request message #1-1. However, even when these messages #1-1 and #2-1 are transmitted in the reverse order, multiple allocation also occurs so that it is sufficient that either one of the signatures is made effective.

Figure 10:
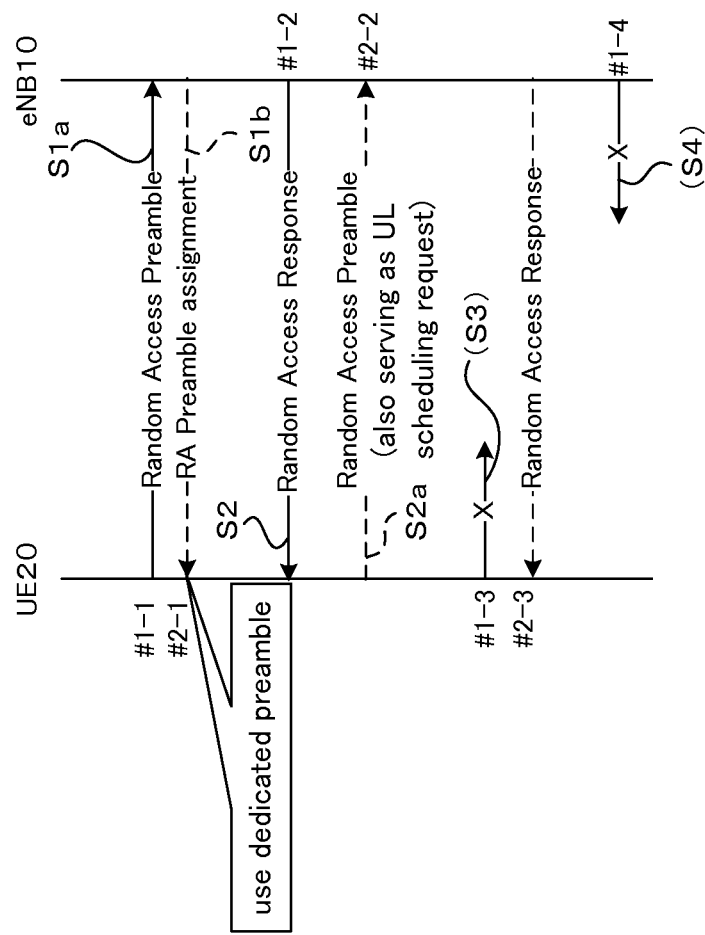
FIG. 10 is a sequence diagram explaining a first modification to the second embodiment.

(2.1) First Modification:

The above message also serving as UL scheduling request to the eNB 10 may be a message (Random Access Preamble) #2-2 transmitted in step S2*a* in FIG. 7 as denoted in the example FIG. 10.

In this case, the UE 20 needs not transmit the message #1-3 and can consequently halt the transmission of the message #1-3 (step S3). Accordingly, unnecessary transmission of uplink messages can be avoided so that efficiently use of uplink wireless resource (band) can be ensured.

Since the eNB 10 cannot recognize (i.e., cannot manage) that which UE 20 uses which preamble unless receives the message #1-3, there is no need to release the preamble (no need to carry out step S3-2 in FIG. 7). Consequently, it is possible to reduce the processing load of the preamble management on the eNB 10.

Figure 11:
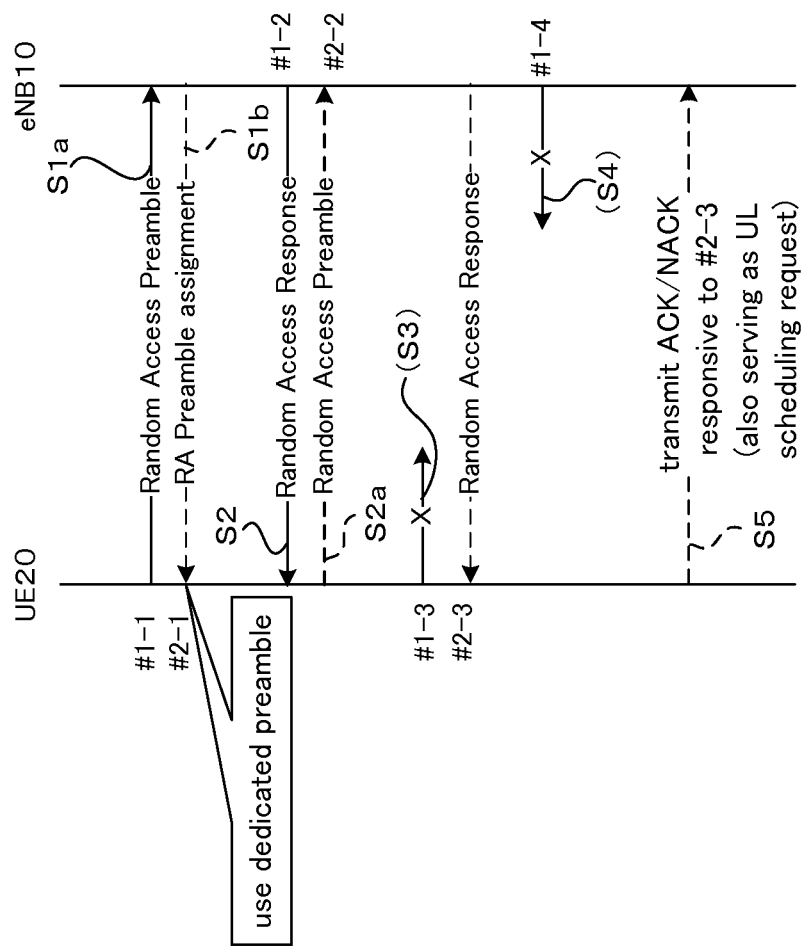
FIG. 11 is a sequence diagram explaining a second modification to the second embodiment.

(2.2) Second Embodiment:

Further, alternative to transmitting the UL scheduling request to the eNB 10 during the non-contention based random access procedure, the UL scheduling request may be, as denoted in FIG. 11, transmitted along with the response (ACK/NACK signal) responsive to the message #2-3 upon completion of the procedure (step S5 in FIG. 11). Further alternatively, the request may be transmitted in the form of an independent uplink message after the transmission of the message #2-3.

Figure 12:
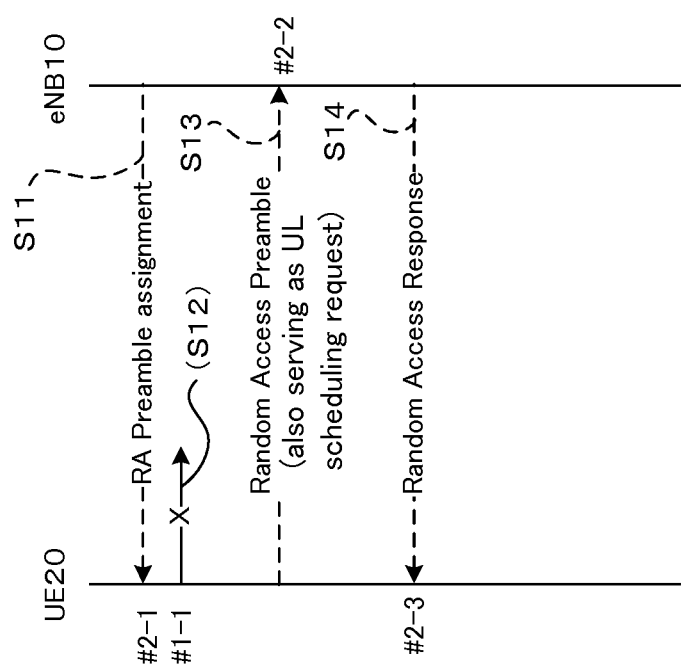
FIG. 12 is a sequence diagram explaining a procedure (method) of random access according to a third embodiment.
Figure 13:
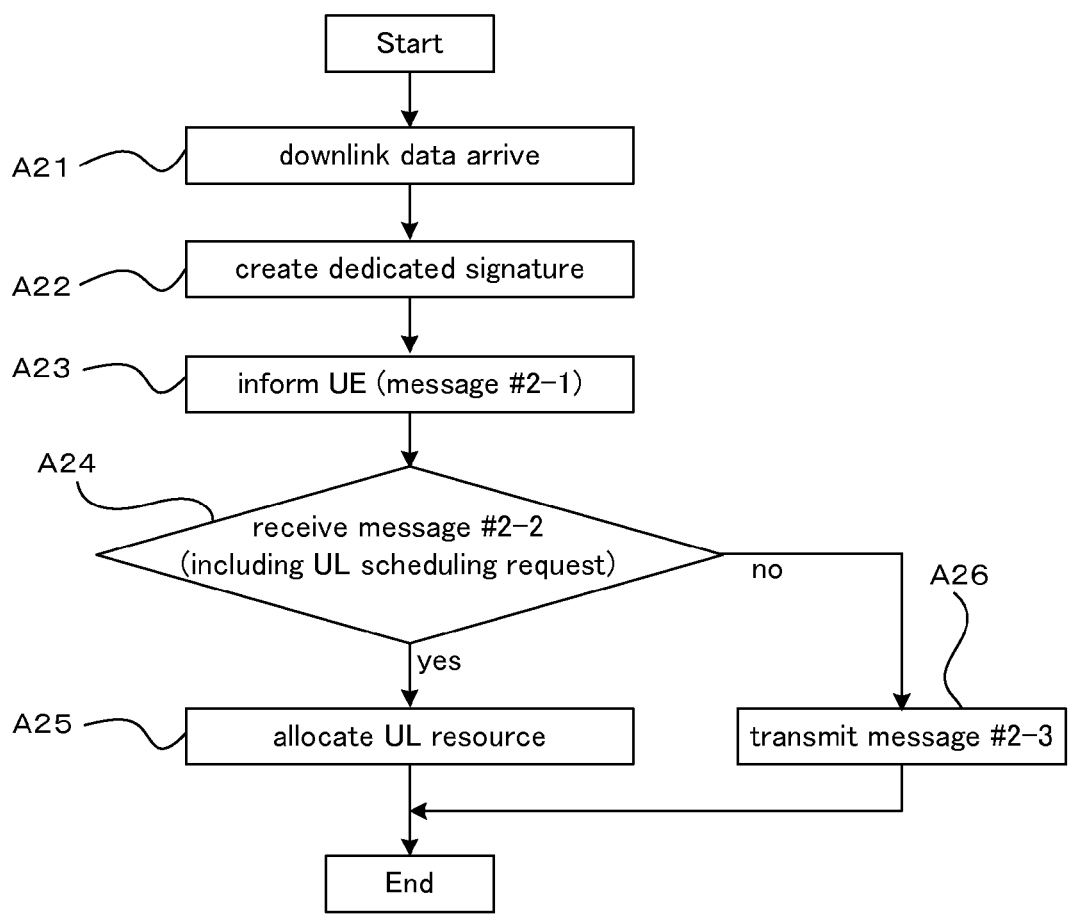
FIG. 13 is a flow diagram explaining the operation of the eNB when carrying out the random access procedure of FIG. 10.

(3) Third Embodiment:

FIG. 12 is a sequence diagram illustrating a random access procedure according to the third embodiment; FIG. 13 is a flow diagram explaining the operation of eNB 10 during the random access procedure of the third embodiment; and FIG. 14 is a flow diagram explaining the operation of UE 20 during the random access procedure of the third embodiment.

Differently from the first and the second embodiments, description of the third embodiment presumes that uplink data arrive in the UE 20 under a state where a dedicated signature is allocated to the UE 20.

In other words, when downlink data which is destined for the UE 20 and which is transmitted from the upper apparatus arrives at the eNB 10 (i.e., the buffering unit 13 stores downlink data) (step A21 in FIG. 13), the eNB 10 creates and stores a signature (dedicated signature) (step A22 in FIG. 13) that is to be used for random access (UL synchronization request) by the UE 20, the destination of the downlink data (step A2 in FIG. 13), and then transmits the created signature by means of a signature allocation message #2-1 (RA Preamble Assignment) to the destination UE 20 through the transmitting/receiving unit 12 (step A11 in FIG. 12 and step A23 in FIG. 13).

Figure 14:
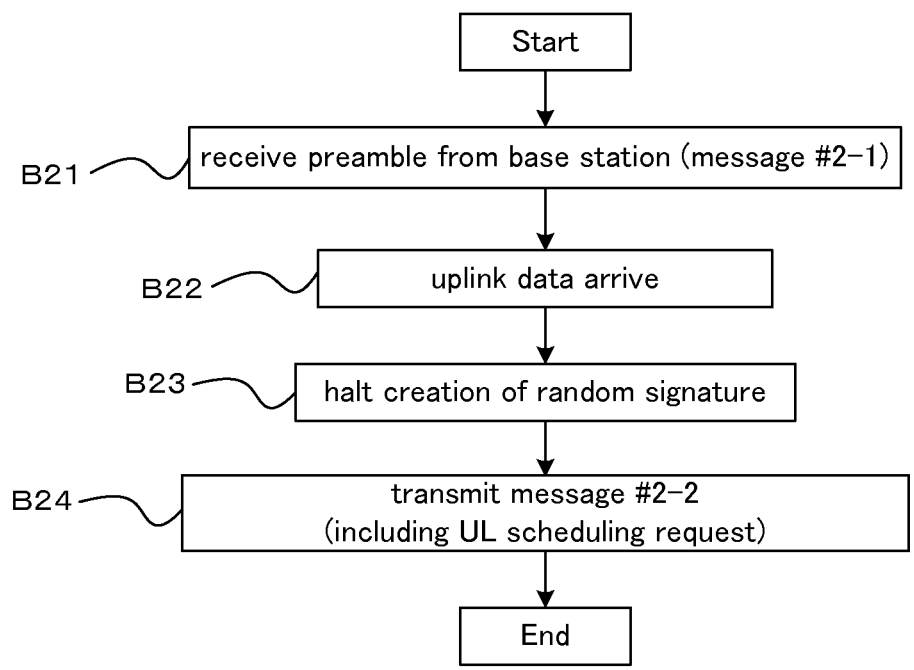
FIG. 14 is a flow diagram explaining the operation of the UE when carrying out the random access procedure of FIG. 10.

Upon receipt of the signature allocation message #2-1, the UE 20 stores and manages the dedicated signature allocated by the received message in the signature managing unit 24 (step B21 in FIG. 14).

After that, when UE 20 generates uplink data and the buffering unit 23 stores the uplink data (step B22 in FIG. 14), the UE 20 (the signature managing unit 24) does not generates a random signature (step S12 in FIG. 12 and step B23 in FIG. 14) differently from the first and the second embodiments.

As the substitute, the UE 20 creates, in the access judging unit 25, an UL synchronization request (Random Access Preamble) message #2-2 containing the dedicated signature allocated by eNB 10 and transmits the created message to the eNB 10 through the transmitting/receiving unit 22 from the antenna 21.

At that time, because of the generation of the uplink message, the UE 20 provides information (an identifier or a flag) indicating that "the message also serves as an UL scheduling request" to the message #2-2 in the identifier providing unit 26 and transmits the message to the eNB 10 (step S13 in FIG. 12 and step B24 in FIG. 14).

In other words, the UE 20 additionally transmits the UL scheduling request to the eNB 19 (sic, correctly 10) in the event of executing random access through the use of a signature for obtaining (establishing) the uplink synchronization when downlink data is generated.

Upon confirmation of the reception of the message #2-2 (also serving as UL scheduling request) (yes route in step A24 in FIG. 13), the eNB 10 causes the wireless resource managing unit 16 to control allocation of the UL resource corresponding to the UL scheduling request (step A25 in FIG. 13) and creates the signature managing unit 15 to create a response message #2-3 to the message #2-2 and transmit the created message to the UE 20 (step S14 in FIG. 12). Conversely, since an UL synchronization request message #2-2 not containing the UL scheduling request (no route in step A24 in FIG. 13) represents a case in which a normal uplink data communication is arriving, the eNB 10 transmits the message #2-3 without allocation of an UL resource (step A26 in FIG. 13).

As described above, according to the method of random access of the third embodiment, after downlink data destined for a UE 20 arrive at eNB 10 and responsively allocates a signature to the same UE 20, the UE 20 does not generate a signature used for the contention based random access, but does continue the non-contention based random access using the signature allocated by the eNB 10. Consequently, the two kinds of random access do not concurrently proceed.

Accordingly, the control plane of the random access can be simplified and signatures used for random access can be efficiently used. In addition, both the UE 20 and the eNB 10 do not have to always manage the two kinds of signature.

Further, since, during the non-contention based random access, information (UL scheduling request), which is transmitted to the eNB 10 during the contention based random access, is transmitted to the eNB 10, the transmitting processing of the uplink data can be surely carried out along with the receiving processing of the downlink data.

Still further, the random access preamble message #2-2 also serves as an UL scheduling request, delay until the start of transmitting uplink data can be reduced as compared with the following fourth embodiment (in which a confirmation response message to the random access response message #2-3 also serves as the UL scheduling request).

Figure 15:
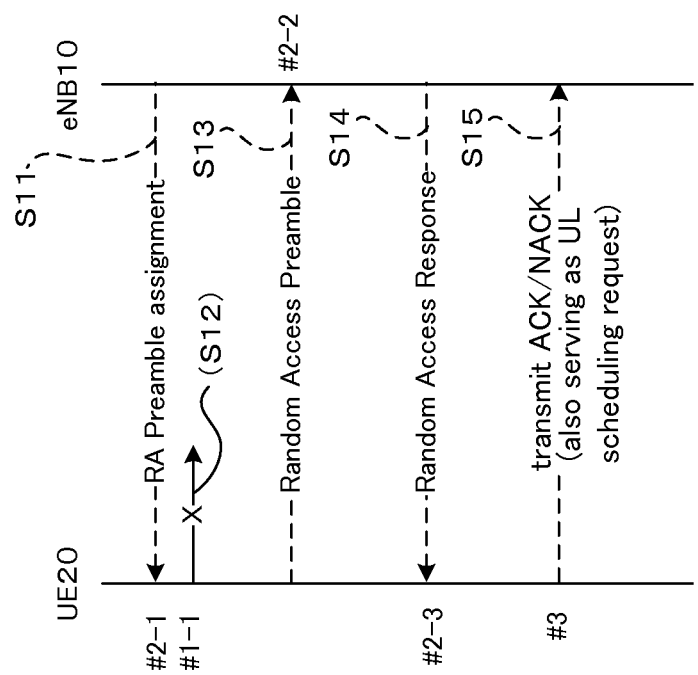
FIG. 15 is a sequence explaining a procedure (method) of random access according to a fourth embodiment.
Figure 16:
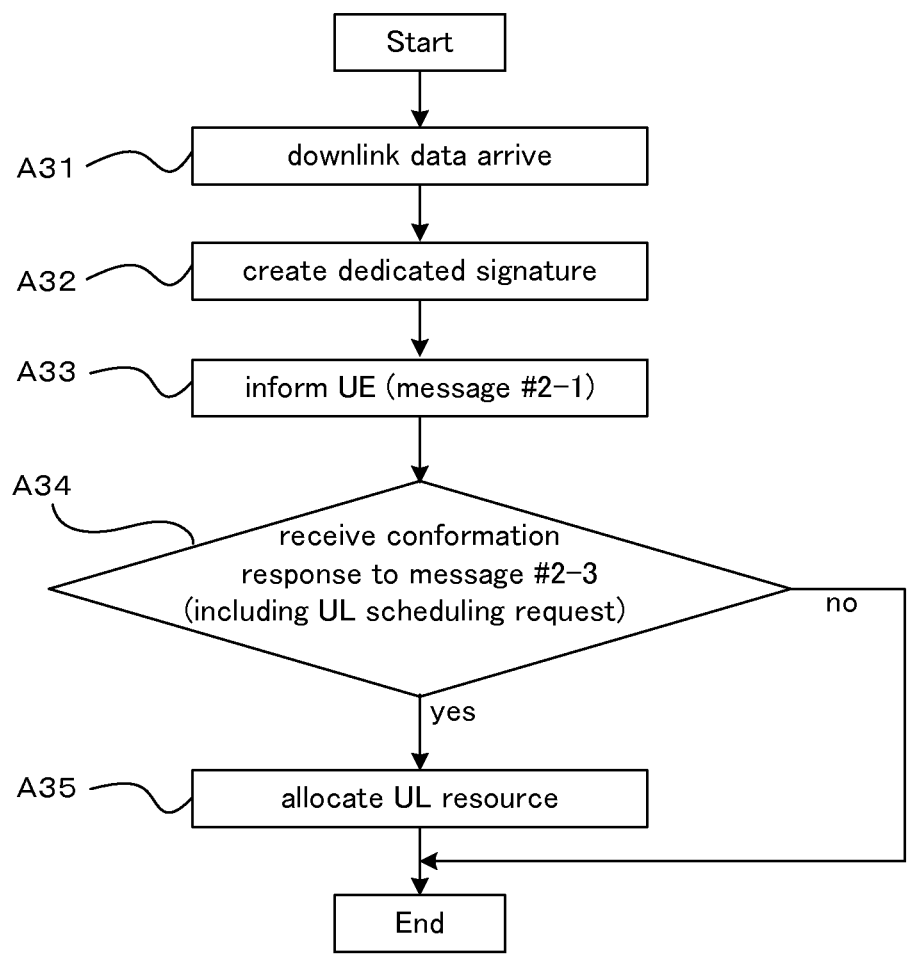
FIG. 16 is a flow diagram explaining the operation of the eNB when carrying out the random access procedure of FIG. 13.

(4) Fourth Embodiment:

FIG. 15 is a sequence diagram illustrating a random access procedure according to the fourth embodiment; FIG. 16 is a flow diagram explaining the operation of eNB 10 during the random access procedure of the fourth embodiment; and FIG. 17 is a flow diagram explaining the operation of UE 20 during the random access procedure of the fourth embodiment.

Similarly to the third embodiment, the fourth embodiment presumes that the UE 20 generates uplink data under a state where a dedicated signature is previously allocated to the UE 20.

In other words, when downlink data which is destined for the UE 20 and which is transmitted from the upper apparatus arrives at the eNB 10 (i.e., the buffering unit 13 stores downlink data) (step A31 in FIG. 16), the eNB 10 creates and stores at the signature managing unit 15 a signature (dedicated signature) (step A32 in FIG. 16) that is to be used for random access (UL synchronization request) by the UE 20, the destination of the downlink data, and then transmits the created signature by means of a signature allocation message #2-1 (RA Preamble Assignment) to the UE 20 through the transmitting/receiving unit 12 (step S11 in FIG. 15 and step A33 in FIG. 16).

Figure 17:
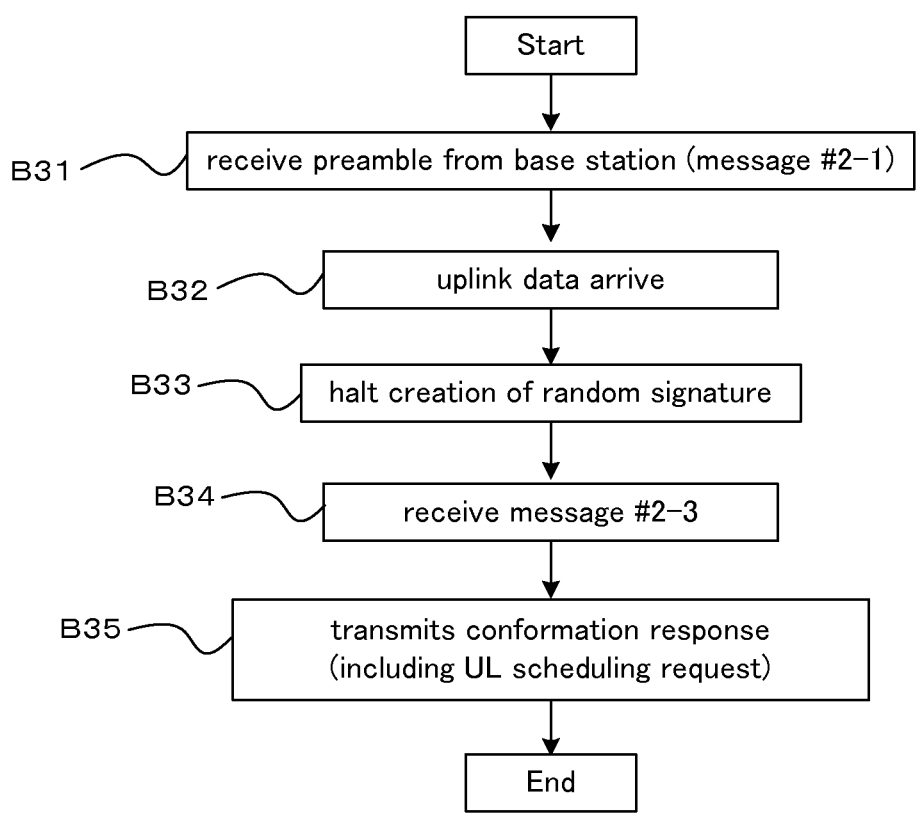
FIG. 17 is a flow diagram explaining the operation of the UE when carrying out the random access procedure of FIG. 13.

Upon receipt of the signature allocation message #2-1, the UE 20 stores and manages the dedicated signature allocated by the received message in the signature managing unit 24 (step B31 in FIG. 17).

After that, UE 20 generates uplink data and the buffering unit 23 stores the uplink data (step B32 in FIG. 17), the UE 20 (the signature managing unit 24) does not generate a random signature (step S12 in FIG. 15 and step B33 in FIG. 17) differently from the first and the second embodiments.

As the substitute, the UE 20 creates a message #2-2 (Random Access Preamble) containing the dedicated signature allocated by eNB10 in the access judging unit 25, and transmits the message to the eNB 10 through the transmitting/receiving unit 22 from the antenna 21 (step S13 in FIG. 15 and step B34 in FIG. 17).

Upon recognizing reception of the message #2-2 (yes route in step A34 in FIG. 16), the eNB 10 causes the wireless resource managing unit 16 to allocate the UL wireless resource (step A35 in FIG. 16) and causes the signature managing unit 15 to create a response message #2-3 to the message #2-2 and transmit the created message to the UE 20 (step S14 in FIG. 15). Conversely, if the eNB 10 cannot recognize the reception of the message #2-2 (also serving as the UL scheduling request), the eNB 10 terminates the process (no route in step A34 in FIG. 16).

On the other hand, upon receipt of the response message #2-3 from the eNB 10 (step B34 in FIG. 17), the UE 20 creates a confirmation response (ACK/NACK) message #3 to the response message #2-3 in the access judging unit 25 and transmits the created message to the eNB 10. At that time, the UE 20 provides information (an identifier or a flag) indicating that "the message #3 also serves as an UL scheduling request" to the confirmation response message #3 in the identifier providing unit 26 and transmits the message to the eNB 10 (step 35 in FIG. 17). The provided information may be transmitted by a dedicated uplink message alternatively to being transmitted concurrently with the confirmation response message #3.

In other words, when executing random access through the use of a signature for obtaining (establishing) the uplink synchronization, the UE 20 additionally transmits the UL scheduling request to the eNB 10 when the random access terminates.

As described above, according to the method of random access of the fourth embodiment, when uplink data is generated in a UE 20 after the eNB 10 generates downlink data destined for the UE 20 and responsively allocates a signature to the same UE 20, the UE 20 does not create a signature used for the contention based random access but does continue the non-contention based random access using the signature allocated by the eNB 10, which thereby brings the same effects and advantages as the third embodiment.

In addition, since the confirmation response message #3 to the random access response message #2-3 also serves as an UL scheduling request, at least transmission of downlink data can be normally started even if the eNB 10 cannot correctly receive or recognize the confirmation response message #3 due to the propagation environment.

The uplink message also serving as an UL scheduling request may be, for example, one for reporting the CQI to the eNB 10.

Figure 18:
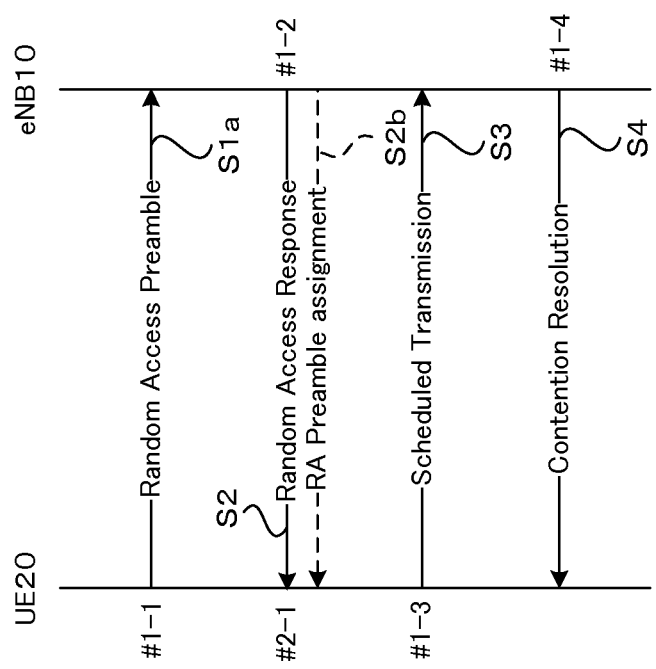
FIG. 18 is a sequence diagram explaining a procedure (method) of random access according to a fifth embodiment.

(5) Fifth Embodiment:

FIG. 18 is a sequence diagram explaining a random access procedure of the fifth embodiment. This embodiment is an example of transmitting the signature allocation message (RA preamble Assignment) #2-1 after the transmission of Response message (Random Access Response) #1-2 to the UE 20 from the eNB 10.

In other words, the UE 20 generates uplink data, the UE 20 creates a random signature at the signature managing unit 24 and transmits a random access preamble message (uplink transmission request) #1-1 containing the created random signature to the eNB 10 (step S1a).

Upon receipt of the message #1-1, the eNB 10 replay with the response message (Random Access Response) #1-2 to the received uplink transmission request message #1-1 (step S2) along with a timing advanced as synchronization signal for uplink communication, an uplink grant for transmission permission, and others. If a number of UEs 20 concurrently transmit requests through the RACH, the eNB 10 returns the response message #1-2 to the UEs 20.

At this stage, when downlink data which is destined for the UE 20 and which is from the upper apparatus arrives at the eNB 10, the eNB 10 creates a dedicated signature in the signature managing unit 15, and transmits the signature to the UE 20 via the signature allocation message (RA Preamble Assignment) #2-1 (step S2b).

Upon receipt of the signature allocation message (RA Preamble Assignment) #2-1, multiple allocation occurs due to the presence both the random signature and the dedicated signature at the UE 20. When detecting the multiple allocation, the UE 20 selects one signature and continues the execution of the random access corresponding to the selected signature (FIG. 18 assumes the contention based random access is selected) in the same manner as the first and the second embodiments.

In this case, the uplink message #1-3 that is to be transmitted in the later step S3 can also serve as UL synchronization confirmation the same as the first embodiment. Alternatively, the uplink message #1-3 can also serve as the UL scheduling request the same as the second embodiment. Further, the uplink message (Random Access Preamble) #2-2 can also serve as the UL scheduling request, which may be transmitted by means of an ACK/NACK signal responsive to the response message #2-3 or may be transmitted by means of a dedicated uplink message.

Then, the eNB 10 confirms the effective ID of the UE 20 by, for example, receiving the message #1-3 and can release one of the signatures in the state of the multiple allocation.

Namely, from the first and the fifth embodiment, the signature allocation message (RA Preamble Assignment) #2-1 may be transmitted at any timing as long as before the eNB 10 receives the message #1-3.

Figure 19:
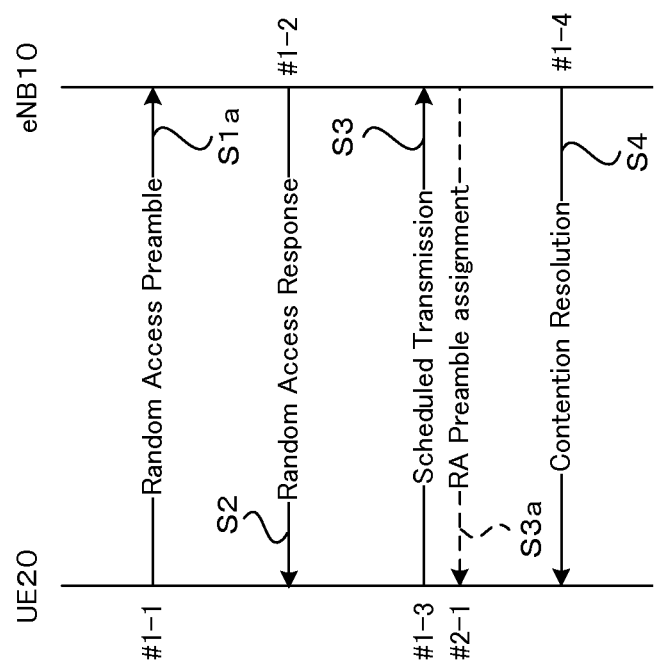
FIG. 19 is a sequence explaining a procedure (method) of random access according to a sixth embodiment.

(6) Sixth Embodiment:

FIG. 19 is a sequence diagram explaining a random access procedure of the sixth embodiment. This embodiment is an example of transmitting the signature allocation message (RA preamble Assignment) #2-1 after the transmission of a message (Scheduled Transmission) #1-3 to the eNB 10 from the UE 20.

Specifically, when the UE 20 generates uplink data, the UE 20 transmits the random access preamble message (uplink transmission request) #1-1 containing the random signature to the eNB 10 (step S1a), receives a response message #1-2 to this message (step S2), and transmits the message #1-3 (step S3).

Upon receipt of the message #1-3, the eNB 10 starts the detection of the effective ID (terminal ID) of the UE 20. Successful detection of the effective ID makes it possible to recognize that the contention of signatures occurs between which UEs 20. If a contention occurs, the eNB 10 transmits the contention resolution message (Contention Resolution) #1-4 to the UEs 20 in question to solve the contention (step S4).

Here, presuming that the eNB 10 could not recognize the message #1-3 due to the reason that during processing the message #1-3, downlink data destined for the UE 20 arrives at the eNB 10 from the upper apparatus (the buffering unit 13 stores downlink data) and therefore the receiving of the message #1-3 could not be completed.

In this case, the eNB 10 causes the signature managing unit 15 to create and store a signature (dedicated signature: the second information) that is to be used for random access (UL synchronization request) by UE 20, and transmits the dedicated signature via the signature allocation message (RA preamble Assignment) #2-1 to the UE 20 through the transmitting/receiving unit 12 (step S3a).

Upon completion of transmitting and receiving processing on these messages #1-3 and #2-1 the eNB 10 can recognize "which UE 20 uses which signature", that is, can recognize "two signatures (i.e., Random Preamble and Dedicated Preamble) are issued to which UE 20.

Here, when the UE 20 and another UE (hereinafter called the second UE) do not establish contention, the UE 20 can be judged to have multiple allocation, so that the eNB 10 (the signature managing unit 15) immediately releases the dedicated signature allocated to the UE 20, and normally transmits a Contention Resolution message #1-4 (step S4). At this time, the uplink synchronization can correctly secured, so that the transmission of downlink data can be started.

Conversely, when the UE 20 and the second UE establish contention, there is a possibility of collision between messages #1-3 that the UE 20 and the second UE transmit. At this stage, the UE 20 cannot be judged to have multiple allocation, and the dedicated signature allocated to the UE 20 cannot be immediately released. In the event of contention, the eNB 10 notifies the UE 20 of the contention through the Contention Resolution message #1-4. This case preferably maintains the dedicated signature until an UE 20 having multiple signatures is detected.

In the meantime, regardless of whether or not the UE 20 notifies the eNB 10 the terminal ID of the UE 20 itself to the eNB 10, the UE 20 can recognize (detect) the presence of both the random signature (Random Preamble) created in the UE 20 itself and the dedicated signature allocated by the eNB 10, that is, occurrence of two kinds of random access, when the transmission of the message #1-3 and the signature allocation message #2-1 is completed.

At that time, when the messages #1-3 transmitted from the UE 20 and the second UE do not collide with each other, the UE 20 grasps that no contention is established with reference to the Contention Resolution message #1-4 notified from the eNB 10. Consequently, the UE 20, for example, releases the dedicated preamble, and maintains UL synchronization in the contention based random access procedure because the UE 20 correctly receives UL timing information via the message #1-2.

Conversely, when the messages #1-3 transmitted from the UE 20 and the second UE collide with each other, the UE 20 grasps that contention is established with reference to the Contention Resolution message #1-4 notified from the eNB 10. Consequently, the UE 20 releases the dedicated preamble and can concurrently perform both the UL synchronization request and the UL scheduling request in the contention based random access the same as the first embodiment.

Alternatively, the UE 20 can perform both the UL synchronization request and the UL scheduling request in the non-contention based random access the same as the second through the fourth embodiments.

Further, as described in the first embodiment, both random access procedures can be concurrently proceed. In other words, upon detection that the contention is established, the non-contention based random access can also be carried out at the same time through the use of the dedicated signature notified in the message #2-1.

The sixth embodiment describes the case where the message #2-1 is transmitted during the message #1-3 is being processed. Needless to say, this embodiment results the same if the message #2-1 is transmitted between the messages #1-2 and #1-3.

The embodiments can selectively perform one among a number of kinds of random access.

In addition, resources such as signatures to be used for the random access can be efficiently used. In addition, the interference of the random access channel (RACH) can be inhibited.

As detailed above, since the embodiments can selectively carry out one among a number of random access procedures and can efficiently use resource such as signatures used for the random access procedures, the embodiments seem to be extremely useful for the technical field of the wireless communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method for random access in a wireless communication system communicating between a base station and a wireless terminal, the method comprising:

at the wireless terminal,
selecting information among first information used for first random access and second information used for second random access, in a case of receiving a new request requesting for one random access among the first random access and the second random access while another random access among the first random access and the second random access is already ongoing;

performing a data communication with the base station during or after completion of a random access using the selected information from the selecting, among the first random access and the second random access, wherein the wireless terminal transmits third information to be transmitted to the base station during random access which is different from the random access using the selected information from the selecting, among the first random access and the second random access.

2. The method for random access according to claim 1, wherein the first information is a first random access preamble and the second information is a second random access preamble.

3. The method for random access according to claim 1, wherein the first information is a first random access preamble and the second information is a second random access preamble.

4. The method for random access according to claim 1, wherein the third information is an identifier which identifies the wireless terminal.

5. The method for random access according to claim 1, wherein the wireless terminal receives the first information used for the first random access from the base station.

6. The method for random access according to claim 1, wherein the wireless terminal receives the second information used for the second random access from the base station.

7. A method for random access in a wireless communication system including a base station and a wireless terminal, the method comprising:

at the wireless terminal,
selecting information among first information used for first random access and second information used for second random access, in a case of receiving a new request requesting for one random access among the first random access and the second random access while another random access among the first random access and the second random access is already ongoing;

transmitting, during or after completion of a random access using the selected information from the selecting, among the first random access and the second random access, third information to be transmitted to the base station during a random access which is different from the random access using the selected information from the selecting, among the first random access and the second random access.

8. The method for random access according to claim 7, wherein the wireless terminal receives the first information used for the first random access from the base station.

9. The method for random access according to claim 7, wherein the wireless terminal receives the second information used for the second random access from the base station.

* * * * *